United States Patent
Lee et al.

(10) Patent No.: US 8,644,845 B2
(45) Date of Patent: Feb. 4, 2014

(54) APPARATUS AND METHOD FOR REPORTING LOSS OF PORTABLE TERMINAL IN WIRELESS COMMUNICATION SYSTEM

(75) Inventors: Kyoung-Ho Lee, Hwaseong-si (KR); Jin-He Jung, Suwon-si (KR)

(73) Assignee: Samsung Electronics Co., Ltd., Suwon-Si (KR)

(*) Notice: Subject to any disclaimer, the term of this patent is extended or adjusted under 35 U.S.C. 154(b) by 209 days.

(21) Appl. No.: 12/925,923

(22) Filed: Nov. 2, 2010

(65) Prior Publication Data

US 2011/0105147 A1     May 5, 2011

(30) Foreign Application Priority Data

Nov. 3, 2009   (KR) .................. 10-2009-0105314

(51) Int. Cl.
*H04W 24/00* (2009.01)
*H04M 1/66* (2006.01)

(52) U.S. Cl.
USPC .............. 455/456.1; 455/456.2; 455/410; 455/411

(58) Field of Classification Search
USPC ................. 455/456.1, 456.2, 410, 411
See application file for complete search history.

(56) References Cited

U.S. PATENT DOCUMENTS

| | | | |
|---|---|---|---|
| 2003/0045270 A1* | 3/2003 | Agrawal et al. | 455/410 |
| 2004/0220725 A1* | 11/2004 | Cheng | 701/207 |
| 2008/0242311 A1* | 10/2008 | Craine et al. | 455/456.1 |
| 2009/0135012 A1* | 5/2009 | Kim et al. | 340/568.1 |
| 2009/0207013 A1* | 8/2009 | Ayed | 340/539.1 |
| 2010/0273452 A1* | 10/2010 | Rajann et al. | 455/411 |
| 2011/0068923 A1* | 3/2011 | Burket et al. | 340/572.1 |

FOREIGN PATENT DOCUMENTS

KR     1020050106981 A     11/2005

* cited by examiner

*Primary Examiner* — Meless N Zewdu
*Assistant Examiner* — Jean Chang (57) ABSTRACT

The present invention is provided to report a loss of a terminal in a wireless communication system. A method of detecting the loss of the terminal includes comparing information elements that change depending on geographical movement of a primary terminal and a secondary terminal when a time for detecting the loss arrives. The loss of the secondary terminal is detected based on the comparison result of the information elements that change depending on the geographical movement of the terminals. The loss of the secondary terminal is reported to the primary terminal.

18 Claims, 6 Drawing Sheets

APPARATUS AND METHOD FOR REPORTING LOSS OF PORTABLE TERMINAL IN WIRELESS COMMUNICATION SYSTEM

PRIORITY

The present application claims the benefit under 35 U.S.C. §119(a) of a Korean patent application filed in the Korean Intellectual Property Office on Nov. 3, 2009 and assigned Serial No. 10-2009-0105314, the entire disclosure of which is hereby incorporated by reference.

TECHNICAL FIELD OF THE INVENTION

The present invention relates to a wireless communication system. More particularly, the present invention relates to an apparatus and method for recognizing a loss of another terminal and for informing the loss to a user of a portable terminal.

BACKGROUND OF THE INVENTION

Recently, there is a rapidly growing demand for a netbook which is a small-sized laptop computer capable of wireless communication. A user of the netbook pays a communication fee to use a wireless communication service. The user may purchase the netbook by receiving a subsidy or at the user's own expense.

The netbook has a size and weight suitable to be carried, and thus, by utilizing the portability of the netbook, the user carries and uses the netbook mostly while travelling. However, because the user carries the netbook while moving, there is a high risk of losing the netbook.

As described above, the user always takes a risk of losing the netbook, which can be costly. Therefore, there is a need for a method for ensuring the benefit of using the netbook to the user against the risk of losing the netbook by rapidly recognizing the loss of the netbook and by reporting the loss and the current location of the netbook to the user.

SUMMARY OF THE INVENTION

To address the above-discussed deficiencies of the prior art, it is a primary aspect of the present invention to provide an apparatus and method for reporting a loss of a netbook to a user in a wireless communication system.

Another aspect of the present invention is to provide an apparatus and method for reporting a location of a portable terminal to a user when the portable terminal is lost in a wireless communication system.

Another aspect of the present invention is to provide an apparatus and method for detecting a loss of a portable terminal by using information that changes according to movement of the portable terminal in a wireless communication system.

Another aspect of the present invention is to provide an apparatus and method for determining whether one of portable terminals is lost by using a comparison result of information that changes according to movement of the portable terminals when there are two portable terminals in a wireless communication system.

In accordance with an aspect of the present invention, a method of detecting a loss of a terminal in a wireless communication system is provided. The method includes comparing information elements that change based on geographical movement of a primary terminal and a secondary terminal when a time of detecting the loss arrives. The loss of the secondary terminal is detected based on the comparison result of the information elements that change according to the geographical movement of the terminals. The loss of the secondary terminal is reported to the primary terminal.

In accordance with another aspect of the present invention, a method of operating a secondary terminal lost in a wireless communication system is provided. The method includes determining whether a call is received from a primary terminal after a loss of the secondary terminal, and generating an alarm sound upon receiving the call.

In accordance with another aspect of the present invention, an apparatus for detecting a loss of a terminal in a wireless communication system is provided. The apparatus includes a controller for comparing information elements that change based on geographical movement of a primary terminal and a secondary terminal when a time of detecting the loss arrives, and detecting the loss of the secondary terminal based on the comparison result of the information elements that change according to the geographical movement of the terminals. A communication unit transmits report data for reporting the loss of the secondary terminal to the primary terminal.

In accordance with another aspect of the present invention, a secondary terminal apparatus in a wireless communication system is provided. The apparatus includes a controller for determining whether a call is received from a primary terminal after a loss of the secondary terminal, and a speaker for generating an alarm sound upon receiving the call.

Other aspects, advantages, and salient features of the invention will become apparent to those skilled in the art from the following detailed description, which, taken in conjunction with the annexed drawings, discloses embodiments of the invention.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with; have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

Throughout the drawings, like reference numerals will be understood to refer to like parts, components and structures.

DETAILED DESCRIPTION OF THE INVENTION

FIGS. 1 through 6, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless communications system.

The present invention described below relates to a technique for reporting a loss of a portable terminal and a location of the lost portable terminal to a user by using another portable terminal when the user loses one of a plurality of portable terminals. For example, the present invention can be used to report a loss of a netbook and a location of the netbook by using a portable terminal when a user of the netbook and the portable terminal loses the netbook. In the following description, the portable terminal includes, in concept, a cellular phone, a Personal Communication System (PCS), a Personal Digital Assistant (PDA), an International Mobile Telecommunication-2000 (IMT-2000) terminal, a laptop computer, a desktop computer, a netbook, and such.

Figure 1:
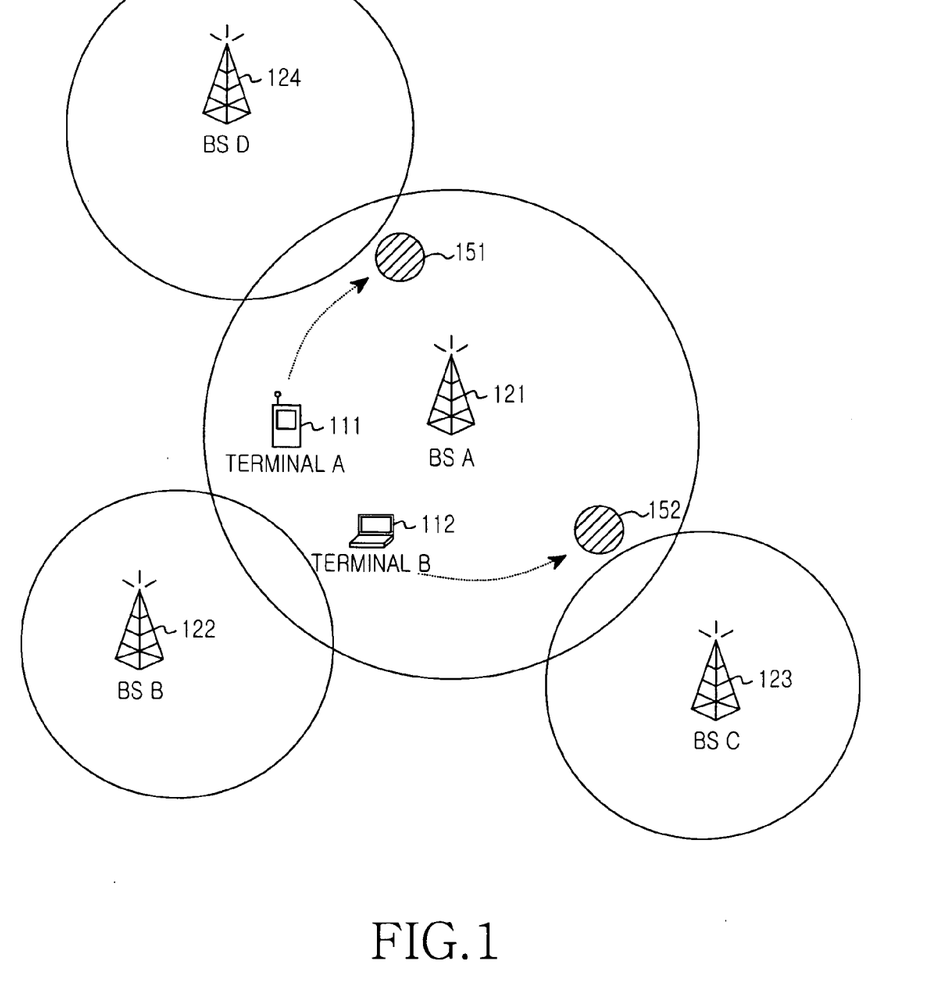
FIG. 1 illustrates a situation of losing a portable terminal considered in the present invention.

FIG. 1 illustrates a situation of losing a portable terminal considered in the present invention.

Referring to FIG. 1, a user owns a terminal A 111 and a terminal B 112. The terminal A 111 and the terminal B 112 are located in a cell of a Base Station (BS) A 121. The terminal A 111 and the terminal B 112 manage a cell Identifier (ID) list and a Location Area Identifier (LAI). The cell ID list is a list of candidate cells for cell selection in an idle state or for handover in a connected state, and includes identifiers of cells with a channel quality greater than or equal to a specific level. The LAI is a geographical unit of a network including at least one cell. As a unit for representing a location of a terminal in a paging process, the LAI is managed through a Location Updating (LU) procedure. Herein, the cell ID list and the LAI are representative examples of an information element that changes depending on geographical movement of the terminal. Therefore, the cell ID list and the LAI can be replaced with any information as long as the information changes according to the geographical movement of the terminal irrespective of a name and format of the information. With regard to FIG. 1, because the terminal A 111 and the terminal B 112 are located in the same place, the terminal A 111 and the terminal B 112 have the same cell ID list and the same LAI. For example, the cell ID list includes the BS A 121 and a BS B 122.

In this example, the terminal A 111 moves to a place A 151 as the user moves, and the terminal B 112 moves to a place B 152 due to a loss, a theft, and such. Accordingly, the BS B 122 is deleted from the cell ID list of the terminal A 111, and a BS D 124 is added to the cell ID list. In addition, the BS B 122 is deleted from the cell ID list of the terminal B 112, and a BS C 123 is added to the cell ID list. That is, the cell ID list of the terminal A 111 becomes different from that of the terminal B 112. Therefore, it is determined that the terminal B 112 is lost, and the loss of the terminal B 112 is reported to the user by using the terminal A 111. In addition, if the location of the terminal B 112 can be traced, a location of the terminal B 112 is also reported.

The loss of the terminal B 112 is detected by the BS A 121 or the terminal B 112. The BS A 121 is aware of the cell ID list and LAI of the terminals 111 and 112. Therefore, the BS A 121 can recognize a change in the cell ID list and LAI of the terminals 111 and 112 and can detect the loss. In addition, according to another embodiment of the present invention, if the BS A 121 delivers the cell ID list and LAI of the terminal A 111 to the terminal B 112, the terminal B 112 can also detect the loss.

For the detection of the loss, the fact that the terminal A 111 and the terminal B 112 can be used by the same user has to be pre-registered. The registration can be achieved by a system manager in an off-line manner. An entity for detecting the loss has to recognize the content of the registration. For example, if the loss is detected by the BS A 121, the BS A 121 is aware of the registered content of the terminal A 111 and the terminal B 112. Accordingly, the BS A 121 periodically monitors the cell ID lists and LAIs of the terminal A 111 and the terminal B 112, and performs a loss detection algorithm according to a change of the cell ID lists and LAIs. The detailed content of the loss detection algorithm may differ depending on the preferences of those who implement the present invention.

For example, the BS A 121 periodically evaluates and compares the cell ID lists and LAIs of the terminal A 111 and the terminal B 112. If the comparison result shows that the cell ID list or LAI of the terminal A 111 does not coincide with that of the terminal B 112 and the cell ID list or LAI of the terminal B 112 changes, the BS A 121 determines that the terminal B 112 is lost. However, even if the cell ID lists or LAIs do not coincide with each other, if the cell ID list or LAI of the terminal B 112 does not change, the BS A 121 does not determine that the terminal B 112 is lost. This is because there may be a situation in which the user keeps the terminal B 112 in a specific place and then moves to another place while carrying only the terminal A 111. As time passes and the cell ID list or LAI of the terminal B 112 does not change, if the cell ID lists or LAIs do not coincide with each other, a possibility of the loss increases, and thus the BS A 121 more frequently performs an operation of evaluating and comparing the cell ID list and LAI. However, according to another embodiment of the present invention, the loss detection algorithm for detecting the loss can apply by using only the disparity of the cell ID list or LAI.

In addition to the aforementioned loss detection and report, in order to easily find the terminal B 112, when the user approaches the terminal B 112 while carrying the terminal A 111 and then sends a call to the terminal B 112 through the terminal A 111, the terminal B 112 outputs a specific alarm sound. By using the specific alarm sound, the user can determine a more correct location of the terminal B 112.

Hereinafter, a terminal and a BS for reporting a loss as described above will be described with reference to the accompanying drawings.

In the following description, two terminals are registered for use by the same user, and a terminal which receives a result of loss detection is referred to as a primary terminal, and a terminal of which a loss is observed is referred to as a secondary terminal.

Figure 2:
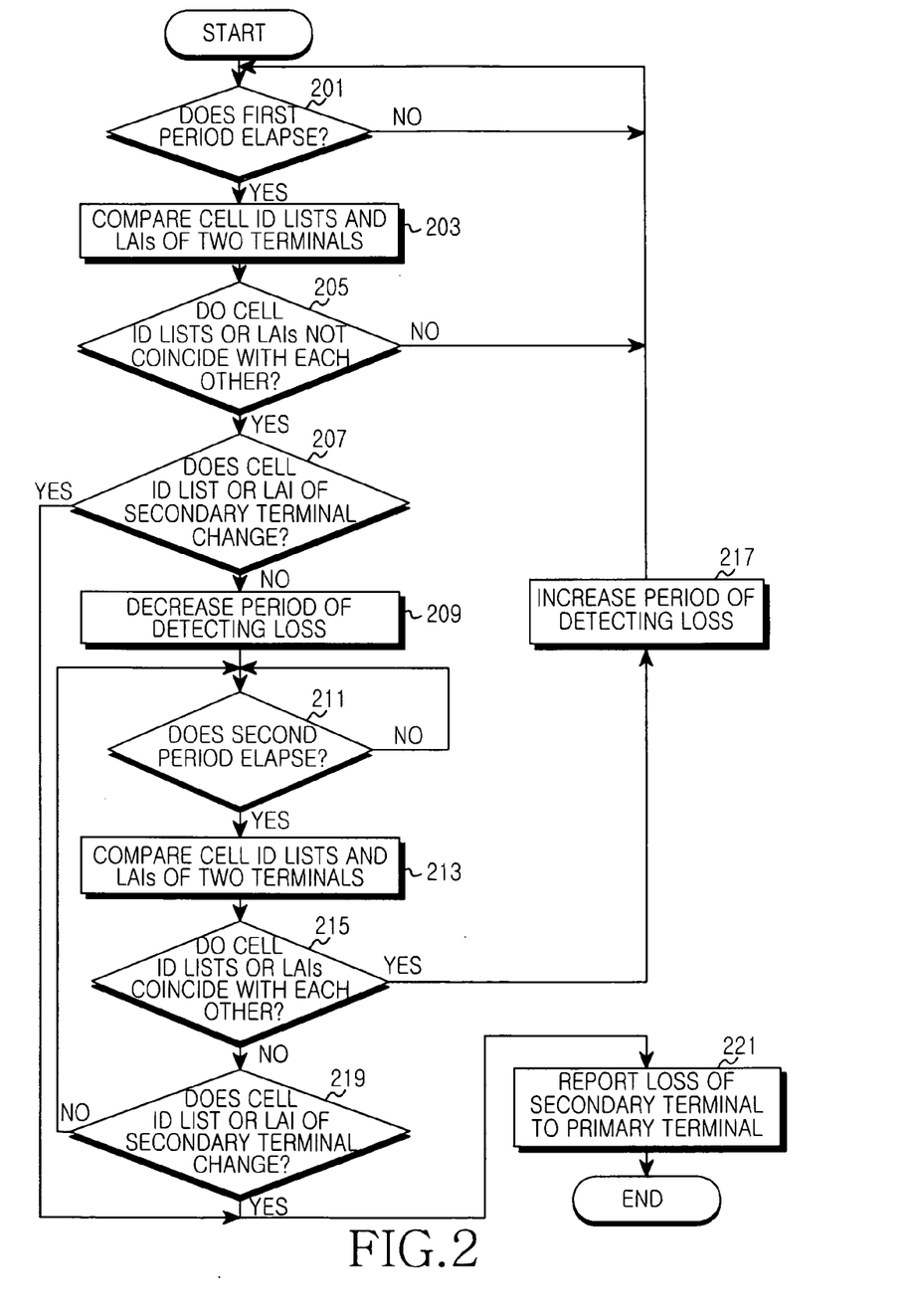
FIG. 2 illustrates a process of operating a base station (BS) or a secondary terminal in a wireless communication system according to an embodiment of the present invention.

FIG. 2 illustrates a process of operating a BS or a secondary terminal in a wireless communication system according to an embodiment of the present invention. For convenience of explanation, an entity for performing the process of FIG. 2 is referred to as a loss determination unit.

Referring to FIG. 2, the loss determination unit determines whether a first period elapses in step 201. The first period is a time interval for detecting a loss of the portable terminal, and is used to determine when cell ID lists and LAI patterns of primary and secondary terminals coincide with each other.

If the first period expires, the loss determination unit compares the cell ID lists and the LAIs of the two terminals in step 203. If the loss determination unit is the secondary terminal, the loss determination unit uses the primary terminal's cell ID list and LAI received periodically from the BS or received by request. That is, although not shown in FIG. 2, the loss determination unit receives the cell ID list and LAI of the primary terminal periodically from the BS or by request.

After comparing the cell ID lists and LAIs, proceeding to step 205, the loss determination unit determines whether the cell ID lists or LAIs of the two terminals do not coincide with each other. In other words, the loss determination unit determines whether cell IDs included in the cell ID lists or the LAIs are different from each other. If the cell ID lists and the LAIs coincide with each other, the procedure returns to step 201.

On the other hand, if the cell ID lists or the LAIs do not coincide with each other, proceeding to step 207, the loss determination unit determines whether the cell ID list or LAI of the secondary terminal changes. That is, by using a history of the cell ID list and LAI of the secondary terminal, the loss determination unit determines whether the secondary terminal is moving. If the cell ID list or LAI of the secondary terminal changes, the procedure proceeds to step 221.

Otherwise, if the cell ID list or LAI of the secondary terminal does not change, proceeding to step 209, the loss determination unit decreases a period of detecting the loss. That is, because the cell ID lists or LAIs of the primary and secondary terminals do not coincide with each other and thus a possibility of the loss increases, the loss determination unit decreases the period in order to detect the loss more frequently.

In step 211, the loss determination unit determines whether a second period elapses. The second period is a time interval for detecting the loss of the portable terminal, and is used when cell ID lists and LAI patterns of the primary terminal and the secondary terminal do not coincide with each other.

If the second period expires, the loss determination unit compares the cell ID lists and the LAIs of the two terminals in step 213. If the loss determination unit is the secondary terminal, the loss determination unit uses the primary terminal's cell ID list and LAI received periodically from the BS or received by request. That is, although not shown in FIG. 2, the loss determination unit receives the cell ID list and LAI of the primary terminal periodically from the BS or by request.

After comparing the cell ID lists and LAIs, proceeding to step 215, the loss determination unit determines whether the cell ID lists or LAIs of the two terminals coincide with each other. That is, the loss determination unit determines whether the cell ID lists or the LAIs, which were different from each other, coincide with each other.

If the cell ID lists and LAIs coincide with each other, proceeding to step 217, the loss determination unit increases the period of detecting the loss, and then the procedure returns to step 201. That is, because the cell ID lists or LAIs of the primary and secondary terminals coincide with each other and thus a possibility of the loss decreases, the loss determination unit increases the period in order to detect the loss less frequently.

On the other hand, if the cell ID lists or the LAIs do not coincide with each other, proceeding to step 219, the loss determination unit determines whether the cell ID list or LAI of the secondary terminal changes. That is, by using a history of the cell ID list and LAI of the secondary terminal, the loss determination unit determines whether the secondary terminal is moving. If the cell ID list or LAI of the secondary terminal does not change, the procedure retunes to step 211.

Otherwise, if the cell ID list or LAI of the secondary terminal changes, proceeding to step 221, the loss determination unit determines that the second terminal is lost, and reports the loss of the secondary terminal to the primary terminal. If a location of the secondary terminal can be traced, the loss determination unit also reports location information of the secondary terminal. For example, the tracing of the location may be performed by a Global Positioning System (GPS) and an algorithm using a signal transmission time such as a Time Difference of Arrival (TDOA). If the loss determination unit is the BS, the loss determination unit reports the loss by transmitting a message, or an equivalent, directly to the primary terminal. Otherwise, if the loss determination unit is the secondary terminal, the secondary terminal reports the loss to the primary terminal via the BS. That is, the loss determination unit reports the loss to the BS, and then the BS reports the loss to the primary terminal. To report the loss, a Short Message Service (SMS), a Multimedia Message Service (MMS), an Electronic (E)-mail, or an equivalent notification tool can be used. In an embodiment, a signaling devised for the report of the loss can be used.

Figure 3:
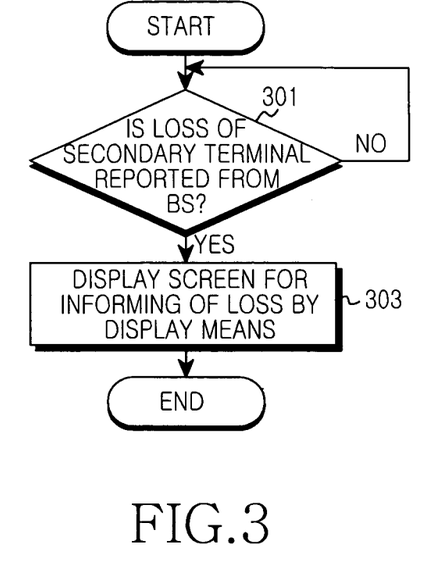
FIG. 3 illustrates a process of operating a primary terminal in a wireless communication system according to an embodiment of the present invention.

FIG. 3 illustrates a process of operating a primary terminal in a wireless communication system according to an embodiment of the present invention.

Referring to FIG. 3, the primary terminal determines whether a loss of a secondary terminal is reported from a BS in step 301. To report the loss, an SMS, an MMS, an E-mail, an equivalent notification tool, or a signaling devised for the report of the loss can be used.

When the loss is reported, proceeding to step 303, the primary terminal displays a screen for informing of the loss by a display means. In addition, when location information of the secondary terminal is also received, the primary terminal displays information for reporting the location of the secondary terminal along with the notification of the loss.

Figure 4:
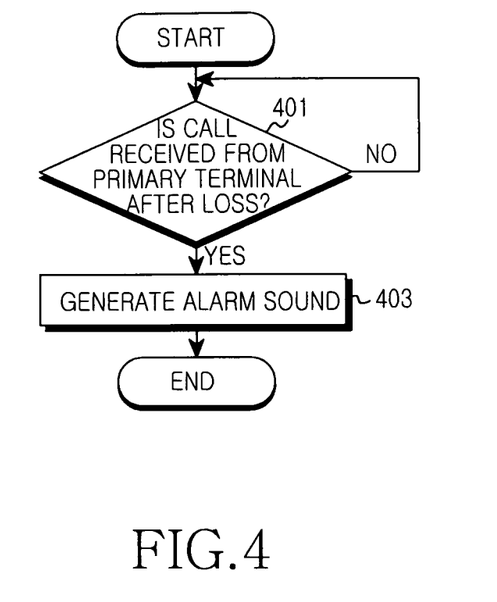
FIG. 4 illustrates a process of operating a secondary terminal in a wireless communication system according to an embodiment of the present invention.

FIG. 4 illustrates a process of operating a secondary terminal in a wireless communication system according to an embodiment of the present invention.

Referring to FIG. 4, the secondary terminal determines whether a call is received from a primary terminal after a loss of the secondary terminal in step 401. Herein, whether the call is after the loss of the secondary terminal can be known by determination of the secondary terminal or by report from a BS.

When the call is received from the primary terminal, proceeding to step 403, the secondary terminal generates a specific alarm sound. The specific alarm sound is for reporting a location of the secondary terminal to a user. By using the specific alarm sound, the user can determine a correct location of the secondary terminal.

Figure 5:
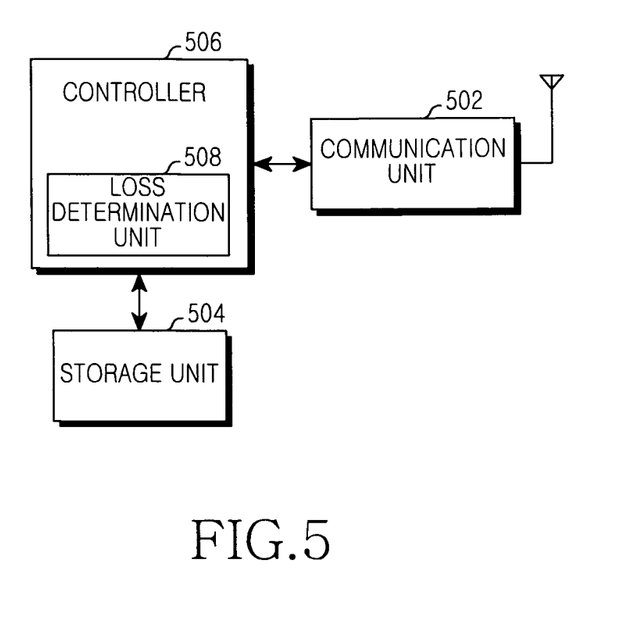
FIG. 5 illustrates a BS in a wireless communication system according to an embodiment of the present invention.

FIG. 5 illustrates a BS in a wireless communication system according to an embodiment of the present invention.

Referring to FIG. 5, the BS includes a communication unit 502, a storage unit 504, and a controller 506.

The communication unit 502 provides an interface for transmitting and receiving a signal through a wireless channel. That is, the communication unit 502 converts transmit data into a Radio Frequency (RF) signal and transmits the converted data through an antenna, and also converts the RF signal received through the antenna into receive data. The communication unit 502 performs conversion between the data and the RF signal according to a communication system protocol.

The storage unit 504 stores a program for an operation of the BS, microcode, temporary data, user contents, and so forth. In particular, the storage unit 504 stores cell ID lists and LAIs of terminals connected to the BS. In addition, the storage unit 504 updates the LAIs through an LU procedure, and updates the cell ID lists through the report from the terminals. Furthermore, the storage unit 504 provides the cell ID lists and the LAIs under the control of the controller 506.

The controller 506 provides overall control to the BS. The controller 506 provides transmit data to the communication unit 502, and processes receive data provided from the communication unit 502. Further, the controller 506 provides data to be stored in the storage unit 504, and requests the storage unit 504 to provide the data. In particular, the controller 506 includes a loss determination unit 508 for detecting a loss of the terminals. The loss determination unit 508 determines whether the secondary terminal moves according to a first period if cell ID lists and LAIs of two terminals coincide with each other or according to a second period if the cell ID lists and LAIs of the two terminals do not coincide with each other. Whether the terminal moves is determined according to whether the cell ID list or LAI changes. If the cell ID lists or LAIs of the two terminals do not coincide with each other and if it is determined that the secondary terminal moves, then the loss determination unit 508 determines that the secondary terminal is lost. Accordingly, the controller 506 generates report data for reporting the loss of the secondary terminal, and transmits the report data to the primary terminal by using the communication unit 502. For the report of the loss, an SMS, an MMS, an E-mail, or the like can be used, or signaling devised for the report of the loss can be used.

Figure 6:
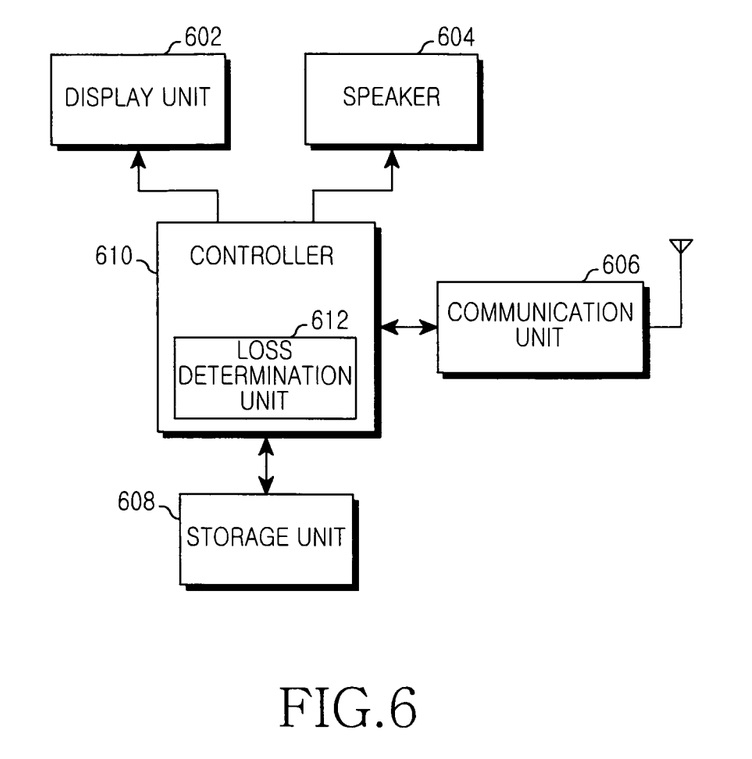
FIG. 6 illustrates a terminal in a wireless communication system according to an embodiment of the present invention.

FIG. 6 illustrates a terminal in a wireless communication system according to an embodiment of the present invention.

Referring to FIG. 6, the terminal includes a display unit 602, a speaker 604, a communication unit 606, a storage unit 608, and a controller 610.

The display unit 602 displays state information, which is generated while the terminal operates, and alphanumeric characters, images, and such, which are produced as an application program is executed. That is, the display unit 602 displays image data provided from the controller 610 on a visual screen. For example, the display unit 602 may be a Liquid Crystal Display (LCD), an Organic Light-Emitting Diode (OLED), and such. The speaker 604 converts an electric sound signal provided from the controller 610 into an audio signal.

The communication unit 606 provides an interface for transmitting and receiving a signal through a wireless channel. That is, the communication unit 606 converts transmit data into an RF signal and transmits the converted data through an antenna, and also converts the RF signal received through the antenna into receive data. The communication unit 606 performs conversion between the data and the RF signal according to a communication system protocol.

The storage unit 608 stores a program for an operation of the terminal, microcode, temporary data, user contents, and such. In particular, the storage unit 608 stores a cell ID list and LAI of the terminal. Further, the storage unit 608 updates the LAI through an LU procedure, and updates the cell ID list according to a channel quality measurement result for neighboring BSs. Furthermore, the storage unit 608 provides the cell ID list and the LAI under the control of the controller 610.

The controller 610 provides overall control to the terminal. The controller 610 provides transmit data to the communication unit 606, and processes receive data provided from the communication unit 606. The controller 610 also provides data to be stored in the storage unit 608, and requests the storage unit 608 to provide the data.

When the terminal operates as a primary terminal, the controller 610 operates as follows. When the loss of a secondary terminal is reported from the BS by using an SMS, an MMS, an E-mail, or signaling devised for the report of the loss, the controller 610 generates a screen for informing of the loss, and reproduces the screen on the display unit 602. In addition, when location information of the secondary terminal is received together with the loss report, the controller 610 displays the location of the secondary terminal with the loss report.

When the terminal operates as the secondary terminal, the controller 610 operates as follows. If a call is received from the primary terminal after the loss of the secondary terminal, the controller 610 generates a signal for generating a specific alarm sound and outputs the specific alarm sound by using the speaker 604. The specific alarm sound is for reporting a location of the secondary terminal to a user. By using the specific alarm sound, the user can determine a correct location of the secondary terminal.

When the terminal operates as the secondary terminal and directly detects the loss, the controller 610 operates as follows. A loss determination unit 612 included in the controller 610 periodically determines whether the secondary terminal moves according to a first time period, if cell ID lists and LAIs of the primary terminal and the secondary terminal coincide with each other, or according to a second time period, if the cell ID lists and LAIs of the primary terminal and the secondary terminal coincide with each other. Whether the terminal moves is determined according to whether the cell ID list or LAI changes. In addition, the cell ID list and LAI of the primary terminal are received periodically from the BS or received by request. If the cell ID lists or LAIs of the two terminals do not coincide with each other and if it is determined that the secondary terminal moves, then the loss determination unit 612 determines that the secondary terminal is lost. Accordingly, the controller 610 generates report data for reporting the loss of the secondary terminal to the BS, and transmits the report data to the BS by using the communication unit 606. To report the loss, an SMS, an MMS, an E-mail, an equivalent notification tool, or signaling devised for the report of the loss can be used.

According to embodiments of the present invention, a cell Identifier (ID) list and a Location Area Identifier (LAI) of a portable terminal such as a netbook are used to detect a loss of the portable terminal. Therefore, the loss of the portable terminal and a time of losing the portable terminal can be correctly determined.

Although the present disclosure has been described with an embodiment, various changes and modifications may be suggested to one skilled in the art. It is intended that the present disclosure encompass such changes and modifications as fall within the scope of the appended claims.

What is claimed is:

1. A method of detecting a loss of a terminal in a wireless communication system, the method comprising:
comparing a first cell Identifier (ID) list of a primary wireless portable terminal and a second cell ID list of a secondary wireless portable terminal, wherein the cell ID list comprises a list of candidate cells for cell selection in an idle state or for handover in a connected state;

determining the secondary wireless portable terminal is lost, if at least one candidate cell is not included in both of the first cell ID list of the primary wireless portable terminal and the second cell ID list of the secondary wireless portable terminal; and reporting the loss of the secondary terminal to the primary terminal.

2. The method of claim 1, wherein detecting the loss of the secondary terminal comprises:

when the information elements do not coincide with each other, determining whether the information element that changes depending on the geographical movement of the secondary terminal is changed; and when the information element for the secondary terminal changes, determining that the secondary terminal is lost.

3. The method of claim 1, wherein detecting the loss of the secondary terminal comprises, when the information elements do not coincide with each other, determining that the secondary terminal is lost.

4. The method of claim 1, wherein the first cell ID list and the second cell ID list are compared when a time for detecting the loss arrives, and wherein the time for detecting the loss arrives with an interval that comprises a first time period if the information elements that change depending on the geographical movement of the terminals coincide between the primary terminal and the secondary terminal and a second time period if the information elements that change depending on the geographical movement of the terminals do not coincide between the primary terminal and the secondary terminal, wherein the first time period is longer than the second time period.

5. The method of claim 4, wherein reporting the loss of the secondary terminal to the primary terminal comprises reporting the loss of the secondary terminal directly to the primary terminal.

6. The method of claim 4, further comprising:

receiving the information element that changes depending on the geographical movement of the primary terminal from a Base Station (BS).

7. The method of claim 6, wherein reporting the loss of the secondary terminal to the primary terminal comprises reporting the loss of the secondary terminal to the BS.

8. A method of operating a secondary terminal that is lost in a wireless communication system, the method comprising:

determining whether a call is received from a primary terminal after a loss of the secondary terminal, the loss determined by comparing a first cell Identifier (ID) list of the primary wireless portable terminal and a second cell ID list of the secondary wireless portable terminal, wherein the cell ID list comprises a list of candidate cells for cell selection in an idle state or for handover in connected state; and generating an alarm sound upon receiving the call.

9. The method of claim 8, wherein the alarm reports a location of the secondary terminal to a user.

10. An apparatus for detecting a loss of a terminal in a wireless communication system, the apparatus comprising:

a controller configured to: compare a first cell Identifier (ID) list of a primary wireless portable terminal and a second cell 1D list of a secondary wireless portable terminal, wherein the cell ID list comprises a list of candidate cells for cell selection in an idle state or for handover in a connected state, and determine the secondary wireless portable terminal is lost, if at least one candidate cell is not included in both of the first cell ID list of the primary wireless portable terminal and the second cell ID list of the secondary wireless portable terminal; and a communication unit configured to transmit report data for reporting the loss of the secondary terminal to the primary terminal.

11. The apparatus of claim 10, wherein, when the information elements do not coincide with each other, the controller is configured to determine whether the information element that changes depending on the geographical movement of the secondary terminal is changed, and when the information element for the secondary terminal changes, the controller is configured to determine that the secondary terminal is lost.

12. The apparatus of claim 10, wherein, when the information elements do not coincide with each other, the controller is configured to determine that the secondary terminal is lost.

13. The apparatus of claim 10, wherein the first cell ID list and the second cell ID list are compared when a time for detecting the loss arrives, and wherein the time for detecting the loss arrives with an interval that comprises a first time period when the information elements that change depending on the geographical movement of the terminals coincide between the primary terminal and the secondary terminal, and a second time period when the information elements that change depending on the geographical movement of the terminals do not coincide between the primary terminal and the secondary terminal, wherein the first time period is longer than the second time period.

14. The apparatus of claim 13, wherein the communication unit is configured to transmit the report data to the primary terminal.

15. The apparatus of claim 13, wherein the communication unit is configured to receive the information element that changes depending on the geographical movement of the primary terminal from a Base Station (BS).

16. The apparatus of claim 15, wherein the communication unit is configured to transmit the report data to the BS.

17. A secondary terminal apparatus in a wireless communication system, the secondary terminal apparatus comprising:

a controller configured to determine whether a call is received from a primary terminal after a loss of the secondary terminal, the loss determined by comparing a first cell Identifier (ID) list of the primary wireless portable terminal and a second cell ID list of the secondary wireless portable terminal, wherein the cell ID list comprises a list of candidate cells for cell selection in an idle state or for handover in a connected state; and a speaker configured to generate an alarm sound upon receiving the call.

18. The secondary terminal apparatus of claim 17, wherein the alarm is configured to report a location of the secondary terminal to a user.

* * * * *